(No Model.) 3 Sheets—Sheet 1.
J. MANI.
VEHICLE BRAKE.
No. 408,421. Patented Aug. 6, 1889.
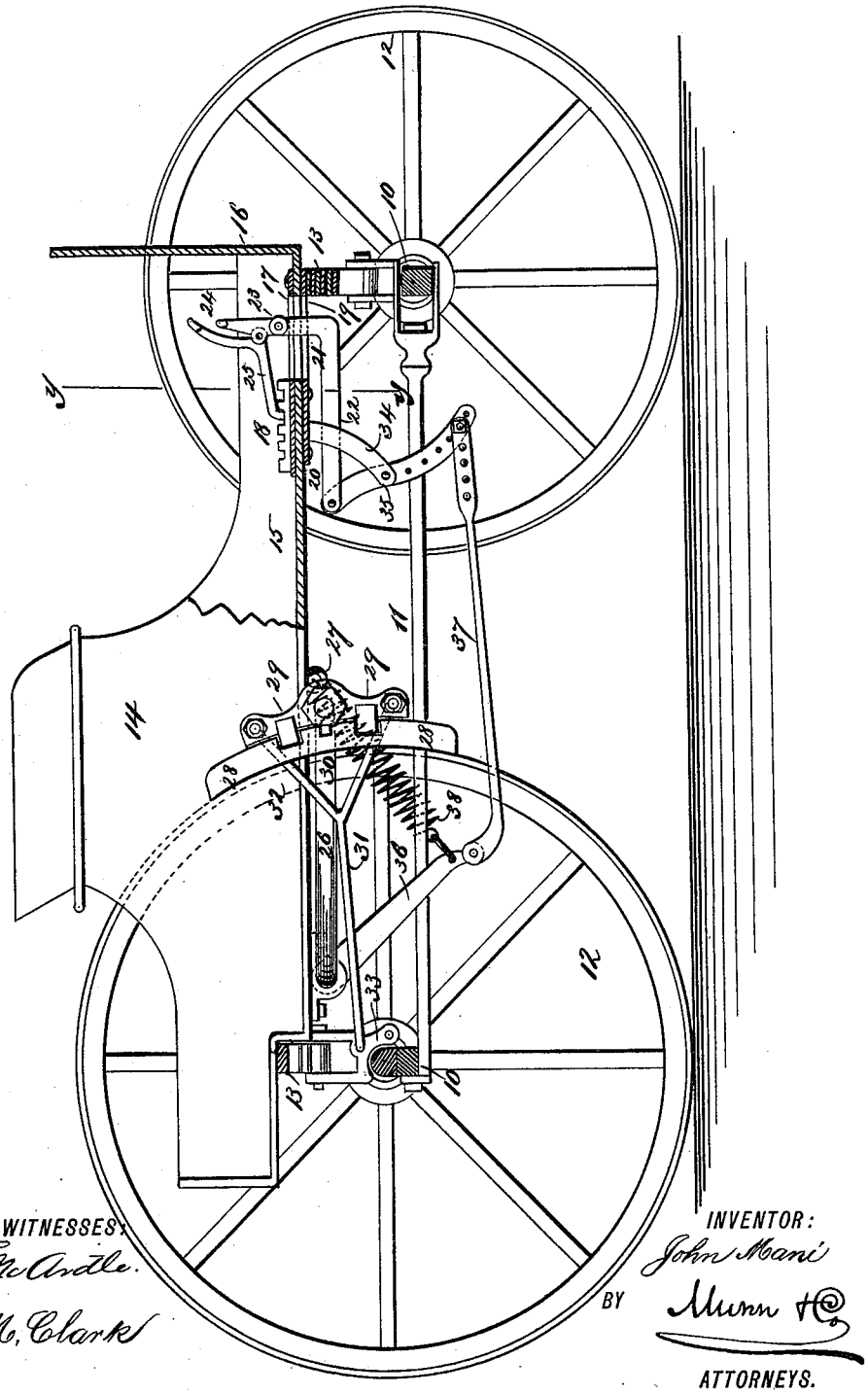
WITNESSES:
F. McArdle.
E. M. Clark
INVENTOR:
John Mani
BY Munn & Co.
ATTORNEYS.

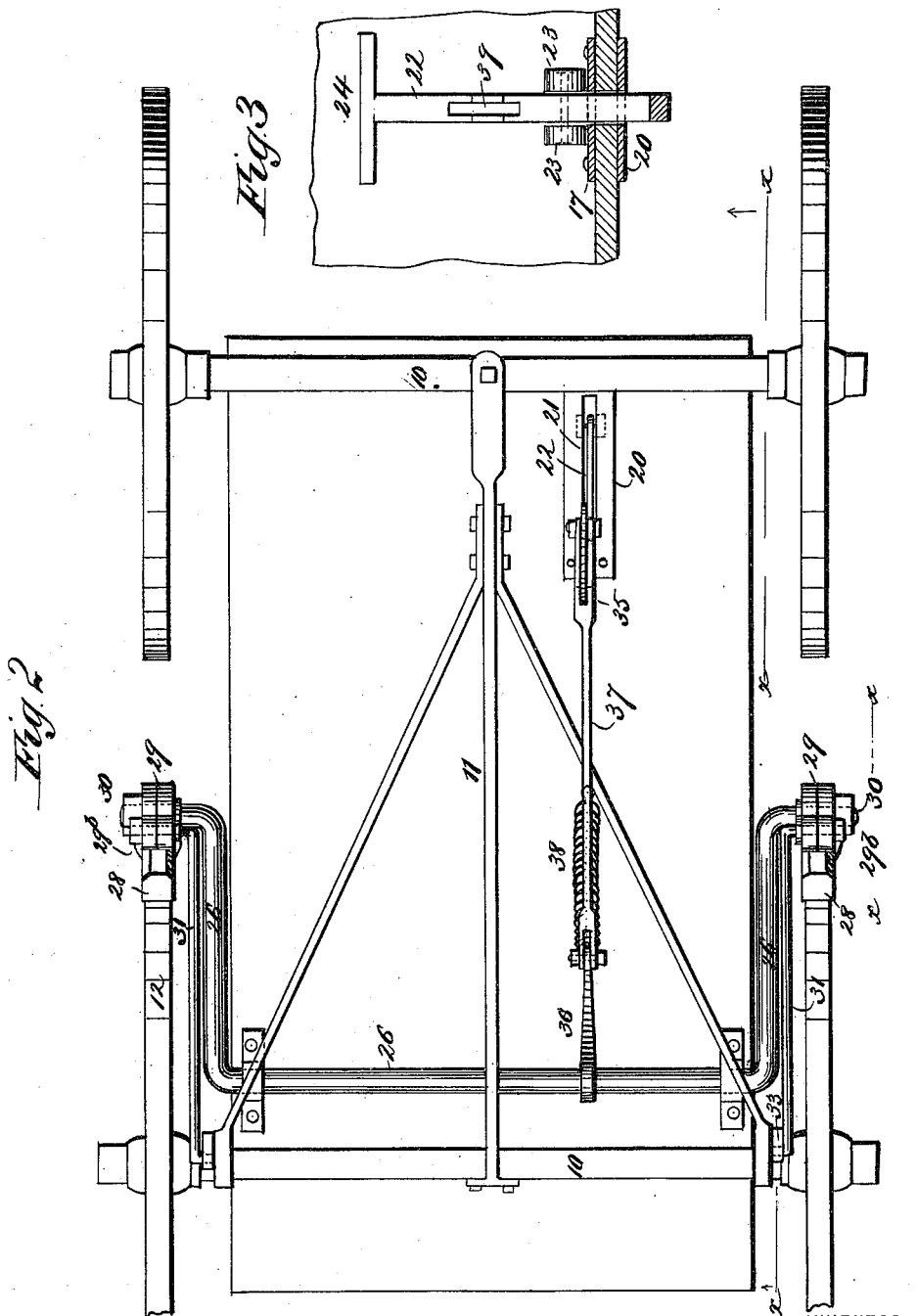

(No Model.) 3 Sheets—Sheet 3.
J. MANI.
VEHICLE BRAKE.
No. 408,421. Patented Aug. 6, 1889.
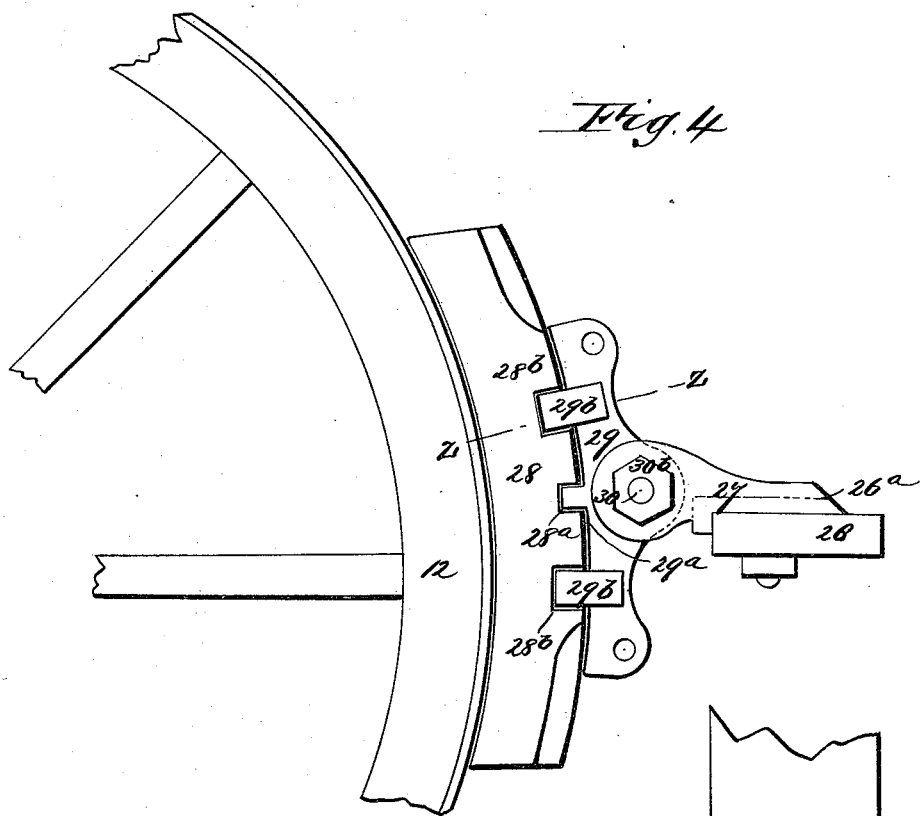
WITNESSES:
F. McArdle
E. McClark
INVENTOR:
John Mani
BY Munn & Co.
ATTORNEYS.

UNITED STATES PATENT OFFICE.

JOHN MANI, OF FRENCH GULCH, CALIFORNIA.

VEHICLE-BRAKE.

SPECIFICATION forming part of Letters Patent No. 408,421, dated August 6, 1889.

Application filed August 9, 1888. Serial No. 282,312. (No model.)

*To all whom it may concern:*

Be it known that I, JOHN MANI, of French Gulch, in the county of Shasta and State of California, have invented a new and Improved Vehicle-Brake, of which the following is a full, clear, and exact description.

My invention relates to an improvement in vehicle-brakes, and has for its object to construct a brake in such manner that the lever for operating the same may be used as a foot-rail.

The further object of the invention is to provide a friction block or shoe which may be readily, expeditiously, and conveniently detached from the shoe-block, and to so construct the friction or shoe block that it may be utilized to support and carry the fenders for the hind wheels of the vehicle; and the further object of the invention is to provide a means whereby the entire surface of the shoes may be brought in contact with the wheels when the brake is applied and entirely from said wheels when the brake is taken off.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a longitudinal section on line *x x* of Fig. 2, the forward side of the body of the vehicle being broken away. Fig. 2 is a bottom plan view of the vehicle having my brake attached. Fig. 3 is a vertical section taken partially on the line *y y* of Fig. 1. Fig. 4 is an enlarged side elevation of the brake-shoe and keeper applied to a wheel. Fig. 5 is a plan view of the same, and Fig. 6 is a transverse section on the line *z z* of Fig. 4.

In carrying out the invention the axles 10 are connected by a reach-bar 11 and provided with the usual wheels 12. Upon the axles forward and rear transverse springs 13 are clipped, upon which springs the body 14 of the vehicle rests.

Upon the upper face of the bottom 15 of the vehicle-body, near the dash 16, a metal plate 17 is secured, which plate at its rear end is provided with a series of rectangular-spaced pins or projections 18, and a longitudinal slot 19 near the forward end. Upon the under side of the bottom 15 of the vehicle a second and parallel plate 20 is secured, provided with a longitudinal slot 21, registering with the slot 19 on the upper plate 17, the bottom board 15 of the body being cut away in alignment with the slots 19 and 21, as best shown in Fig. 1.

The vertical member of an angled lever or bar 22 is carried upward through the slots 19 and 21 and fulcrumed upon the surface of the upper plate adjacent to the slot 19 through the medium of rollers 23, one roller being pivoted at each side of the said vertical member. The upper extremity of the vertical member of the angled bar 22 is provided with a longitudinal attached rail 24, which rail, extending at right angles from each face of the said vertical member, constitutes the foot-rail of the vehicle.

Above the rollers 23 a second angled lever 25 is fulcrumed upon the rear face of the vertical member of the aforesaid angle-lever 22, the vertical member of which smaller angle-lever 25 is made to extend upward and over the foot-rail, and the extremity of the horizontal member is provided with a downwardly-extending lip adapted to enter the space intervening the pins or projections 18, as best illustrated in Fig. 1.

To the under side of the body, in front of the rear axles, an essentially U-shaped rock-shaft 26 is mounted, the extremities of which rock-shaft are projected at right angles forward and in front of the rear wheels, as shown in Fig. 2. At or near the extremities of the rock-shaft 26 a plate 27 is attached, provided with side lugs 26ª, projected from the plate in the direction of the wheels, the said lugs being provided with apertures at their outer ends. The plates 27 are secured to the rock-shaft through the medium of bolts, screws, or other equivalent fastening devices.

The brake-shoes 28, which are ordinarily constructed of wood, are curved or concaved upon one face to engage the wheel, and upon the opposite face, at or about the center, a transverse groove or channel 28ª is produced, and in the sides of the said brake-shoes, above and below the groove or channel, an essentially V-shaped recess 28$^b$ is formed.

The brake-shoe is detachably held in a metal keeper 29, divided centrally into two sections, each section being provided centrally upon the inner face with a transverse rib 29$^a$, adapted to enter the groove or channel 28$^a$ of the shoe. Upon the outer side of each section of the keeper 29 and at each side of the center an inwardly-inclined integral hook 29$^b$ is constructed, having beveled engaging-surfaces, which hooks are adapted to enter the recesses 28$^b$ of the shoe.

The outer face of the several keeper-sections is enlarged at the extremities and the center to provide for the production of transverse apertures at said ends and center. The sections of the keeper when attached to the shoe are united and retained in position between the lugs or arms 26$^a$ of the plate 27 by a bolt 30, passing through the apertures of said lugs or arms and through the central apertures of the keeper, as best shown in Figs. 4 and 5. The bolt 30 is provided with a neck 30$^a$, adjoining the head, of greater diameter than the body, and a suitable lock-nut 30$^b$. Upon the neck of the bolt a spline is preferably produced to prevent said bolt from turning in the plate 27.

It will be readily observed that by unscrewing the lock-nut and sliding the bolt outward—the length of the neck, for instance—and other retaining devices, hereinafter described, being also loosened, the keepers may be readily separated from each other and from the shoe, whereby a new shoe may at any time be conveniently and expeditiously substituted for an old one.

In order that the shoe may be made to bear evenly at all points upon the wheel when the brake is applied and moved readily therefrom when the brake is taken off, a guide-rod 31 is provided for each shoe. The forward end of the said guide-rod, is bifurcated, as illustrated at 32 in Fig. 1, and the extremities of the said bifurcated portions of the rod are threaded and the said threaded ends of the arms 32 are projected horizontally through the upper and lower apertures, respectively, in the keepers 29, as best shown in Figs. 1 and 4. A nut is entered upon the projected threaded ends, and the said keeper-sections are thus, with the aid of the screw-bolt 30, effectually united and clamped to the brake-shoe. The guide-rod 31 may, however, be dispensed with or other equivalent devices may be substituted without departing from the spirit of the invention.

The rear end of the guide-bars 31 is pivoted in a link 33, which link is pivoted to the clips of the rear axles. The rock-shaft 26 is reciprocated from the angled bar 22. The said angle-bar 22 is passed through a transverse slot formed in a downwardly-extending and rearwardly-curved arm 34, which arm forms an integral portion of the bottom plate 20.

The rear extremity of the angle-bar 22 is pivoted to a lever 35, fulcrumed in the lower end of the arm 34, the opposite end of which lever 35 is united with an arm 36, rigidly secured to the rock-shaft through the medium of a connecting-rod 37, as best illustrated in Fig. 1.

The smaller angle-lever 25 is normally held in engagement with the toothed surface of the upper plate through the medium of a spring 38, attached, respectively, to the lower end of the rock-shaft arm 36 and the body of the vehicle at or near the center.

In pivoting the angle-lever 25, which I term, for convenience, a "retaining-lever," a longitudinal slot 39 is formed in the vertical member of the angle-bar 22, as best shown in Fig. 3, which slot is adapted to receive the angle of the said retaining-lever. The rollers 23, whereby the angle-bar 22 is fulcrumed, are usually attached to said bar by passing a pin or pintle through the same, upon which latter the rollers are journaled, as best shown in Fig. 3.

In order to distinguish the angle-bar 25, which I have called a "retaining-lever," I designate the angle-bar 22 as a "brake-lever."

In operation, by pressure of the foot or toe upon the upper end of the retaining-lever the lip of the said lever is raised and lowered into the teeth of the ratchet-plate 17, thereby holding the brake off or on the wheels and when on at any desired pressure. When the brake is not in use, the lip of the said retaining-lever is allowed to drop over the back of the rear tooth, which permits of the use of the foot-rail without operating the brake. It will be observed that when the brake is put on or taken off of the wheel the guide-bars 31, attached to said brake and pivoted to the axle, force the brake-shoes outward with a positive and regular movement or draw the same inward to a contact with the wheels, whereby, when the brake is taken off, no portion of the same will rub against the wheels. The guide-bars 30 also provide for the attachment of a fender for the rear wheels, which may be accomplished by extending or continuing the steel or other equivalent frame-rail of the said fender below the level of the fender proper and attaching or securing the said steel by the nuts or bolts securing the bifurcated ends of the guide-bars to the brake-sockets on both the inside and outside of the said socket.

Having thus described my invention, what I claim as new, and desire to secure by Letters Patent, is—

1. The combination, with the brake-operating slide and an adjacent rack, of a latch lever or pawl pivoted to the slide and adapted to engage the rack, the vertical members of said slide and latch-lever having foot-pieces one above the other, substantially as set forth.

2. In a wagon-brake, the combination, with the wagon-body, of an angle brake-lever having a rolling bearing upon the said wagon-body bottom and provided with a foot-rail integral with the upper end, as and for the purpose specified.

3. The combination, with a vehicle-body, a rock-shaft journaled to said body, and brake-shoes secured to said rock-shaft, of a ratchet-plate secured to the body-bottom, an angle brake-lever having a rolling bearing upon the vehicle-bottom and provided above said bottom with an integral foot-rail, a retaining-lever pivoted to said brake-lever, engaging the ratchet-plate, and connections, substantially as shown and described, between the brake-lever and the rock-shaft, as and for the purpose specified.

4. In a wagon-brake, the combination, with a brake-shoe provided with a transverse groove or channel and side recesses above and below the said groove, of a brake-shaft, sectional and detachable keepers secured to said shaft, provided with transverse ribs adapted to enter the grooves or channels, and an inwardly-projecting hook adapted to enter the side recess of the brake-shoe, substantially as shown and described.

5. The combination, with the vehicle-body and a longitudinally-slotted ratchet-plate secured to the upper face of the bottom of said body, of a sliding brake-lever fulcrumed upon said ratchet-plate, having a foot-rail integral with the upper end, a retaining-lever fulcrumed upon the brake-lever and engaging the ratchet-plate, a rock-shaft journaled beneath the body, brake-shoes secured to the extremities of said rock-shaft, and connections, substantially as shown and described, between the said rock-shaft and brake-lever, as and for the purpose specified.

6. The combination, with a vehicle-body and a longitudinally-slotted ratchet-plate secured to the upper face of the bottom of said body, a brake-lever adjustably fulcrumed upon the said ratchet-plate, and a retaining-lever fulcrumed upon said brake-lever engaging the said ratchet-plate, of a rock-shaft journaled beneath the body, keepers secured upon the outer ends of the said rock-shaft, and a brake-shoe detachably secured within said keepers, substantially as and for the purpose specified.

7. The combination, with the vehicle-body and a longitudinally-slotted ratchet-plate secured to the upper face of the bottom of said body, an angle brake-lever provided with a rolling bearing upon the ratchet-plate, a retaining-lever pivoted to said brake-lever engaging the ratchet-plate, and a rock-shaft journaled beneath the body, provided with an attached downwardly-extending spring-actuated arm, of keepers secured to the outer extremities of the rock-shaft, brake-shoes detachably secured in said keepers, and connections, substantially as shown and described, between the brake-lever and the rock-shaft arm, as and for the purpose specified.

8. The combination, with the vehicle-body and the axles, a longitudinally-slotted ratchet-plate secured to the upper face of the bottom of said body, an angle brake-lever having a rolling bearing upon the ratchet-plate, an angle retaining-lever pivoted upon the brake-lever, engaging the said ratchet-plate, a rock-shaft journaled transversely beneath the body, and a spring-actuated downwardly-extending arm rigid with the rock-shaft, of brake-shoes held on the extremities of the said rock-shaft, bifurcated guide-rods pivoted to the rear axle, passing through and secured to the brake-shoes, and connections, substantially as shown and described, between the rock-shaft arm and the brake-lever, as and for the purpose specified.

9. The combination, with the vehicle-body and the axles, a longitudinally-slotted ratchet-plate secured to the upper face of the bottom of said body, an angle brake-lever having a rolling bearing upon the ratchet-plate, an angle retaining-lever pivoted upon the brake-lever engaging the said ratchet-plate, a retaining-shaft journaled transversely beneath the body, a spring-actuated downwardly-extending arm rigid with the rock-shaft, and toothed sectional keepers secured to the extremities of the said rock-shaft, of brake-shoes detachably held by said keepers, bifurcated guide-rods pivoted to the rear axle, passing through and clamping the sections of the keepers upon the brake-shoes, and connections, substantially as shown and described, between the rock-shaft arm and the brake-lever, as and for the purpose specified.

10. The brake-shoe keeper or holder consisting in the horizontal plate 27, having transversely-apertured lugs or ears $26^a$, the parallel plates 29, having transverse apertures between their ends, a transverse rib $29^a$, and inwardly-projecting hooks $29^b$ above and below said rib, and the bolt passed through the apertured ears and the apertures in the plate, substantially as set forth.

11. The combination, with the brake-shoe or keeper and the attaching-plate to which it is pivoted, of a guide-rod having a forked end connected to the said shoe above and below the pivot, substantially as set forth.

JOHN MANI.

Witnesses:
VOLNEY L. FOX,
JERRY MADDEN.